United States Patent
Katsura et al.

Patent Number: 5,420,952
Date of Patent: May 30, 1995

[54] OPTICAL CONNECTOR EMPLOYING TWO DIFFERENT TYPES OF ADHESIVES

[75] Inventors: Hiroshi Katsura; Makoto Honjo; Toru Yamanishi, all of Kanagawa, Japan

[73] Assignee: Sumitomo Electric Industries, Ltd., Osaka, Japan

[21] Appl. No.: 219,722

[22] Filed: Mar. 29, 1994

[30] Foreign Application Priority Data

Mar. 29, 1993 [JP] Japan ................................. 5-095238
Nov. 22, 1993 [JP] Japan ................................. 5-315994

[51] Int. Cl.⁶ ........................................... G02B 6/36
[52] U.S. Cl. ........................................... 385/80; 385/85
[58] Field of Search ................ 385/60, 66, 68, 78, 385/80, 85

[56] References Cited

U.S. PATENT DOCUMENTS

| | | | |
|---|---|---|---|
| 4,790,622 | 12/1988 | Levinson et al. | 385/80 |
| 4,973,127 | 11/1990 | Cannon, Jr. et al. | 385/56 |
| 5,231,684 | 7/1993 | Narciso, Jr. et al. | 385/80 |

FOREIGN PATENT DOCUMENTS 3441300  5/1986  Germany ........................ G02B 6/36

OTHER PUBLICATIONS

Abstract of Japan vol. 8, No. 151 (P-286) (1588), 59-49,510, Mar. 3, 1984, Hayashi et al.

*Primary Examiner*—Frank Gonzalez
*Attorney, Agent, or Firm*—Cushman Darby & Cushman

[57] ABSTRACT

An optical connector in which the deformation of the connector caused by the shrinkage of an adhesive at the time of adhering and fixing an optical fiber and a ferrule is small, and the increment of loss in connection is suppressed.

The optical connector in which different adhesives are used in an optical fiber insertion hole portion and an adhesive injection opening portion respectively.

15 Claims, 1 Drawing Sheet

OPTICAL CONNECTOR EMPLOYING TWO DIFFERENT TYPES OF ADHESIVES

BACKGROUND OF THE INVENTION

1. Field of the Invention

The present invention relates to an optical connector for optical communication, in which an optical fiber is adhered and fixed to a ferrule so as to realize coupling.

2. Description of the Related Art

FIG. 3 is a perspective view of an example of a ferrule constituting an optical connector. A ferrule 1 is obtained by forming epoxy-system resin containing silica as filler. In the longitudinal direction of the ferrule 1, a plurality of optical fiber insertion holes 2 are formed, and fitting pin insertion holes 3 are formed in both outsides of the fiber insertion holes 2. In the upper surface, an adhesive injection opening 4 for adhering and fixing optical fibers is formed.

An optical fiber 11 in which the coating of the top layer at an end portion of a multi-coated optical fiber 10 is removed is inserted into the optical fiber insertion hole 2 of the ferrule having such a configuration from a ferrule rear 1a, as shown in FIG. 2. Then a thermosetting epoxy-system adhesive 7 is injected between the ferrule 1 and the optical fiber 11 from the adhesive injection opening 4, and the adhesive is hardened at the temperature of about 80° C. so as to adhere and fix the optical fiber 11. After that, the coupled end surface is ground so as to form an optical connector.

The above-mentioned adhesive used for adhering and fixing an optical fiber needs to have so low viscosity as to be charged quite up to the optical fiber insertion hole, and needs to have so high hardness as to fix the optical fiber firmly not to move at the time of grinding. In addition, with reliability such as chemicals durability and the like taken into consideration, a high-temperature thermosetting epoxy-system adhesive has been used conventionally.

Using a thermosetting epoxy-system adhesive for adhering and fixing an optical fiber and a ferrule, a conventional optical connector has a problem in that the ferrule is tensed so as to be deformed, or the optical fiber is given stress so as to increase the loss in connection of the connector, because of the hardening shrinkage which occurs when the adhesive is hardened at a high temperature, the shrinkage which occurs when the adhesive is cooled down into ordinary temperature after the hardening, and the like.

Although this problem can be solved by using an adhesive which is small in Young's modulus, in linear expansion coefficient, or the like, then there occurs another problem that the force of holding an optical fiber is not enough when the optical fiber on the connector end surface is ground, so that the grinding becomes difficult.

SUMMARY OF THE INVENTION

The present invention has an object to provide an optical connector in which the ferrule is not tensed and deformed, or the optical fiber is not given stress to increase the loss in connection of the connector when the adhesive is hardened at a high temperature, when the adhesive is cooled down into ordinary temperature after the hardening, or the like.

As a result of various investigation to solve the foregoing problems, the present inventors found that the following adherence method can be used to obtain an optical connector in which a ferrule can be suppressed from being deformed, the stress given to the optical fiber can be reduced, and the end surface can be ground up well.

(1) Adhesives different in Young's modulus are used for an optical fiber insertion hole portion and an adhesive injection opening portion respectively.

(2) Adhesives different in linear expansion coefficient are used for the optical fiber insertion hole portion and the adhesive injection opening portion respectively.

(3) A thermosetting adhesive is used for the optical fiber insertion hole portion and an ambient-temperature-setting adhesive is used for the adhesive injection opening portion respectively.

(4) Adhesives different in coefficient of hardening shrinkage are used for the optical fiber insertion hole portion and the adhesive injection opening portion respectively.

DETAILED DESCRIPTION OF THE PREFERRED EMBODIMENT

The preferred embodiment of the preferred embodiment of the present invention will be described with respect to accompany with the drawings.

Figure 1:
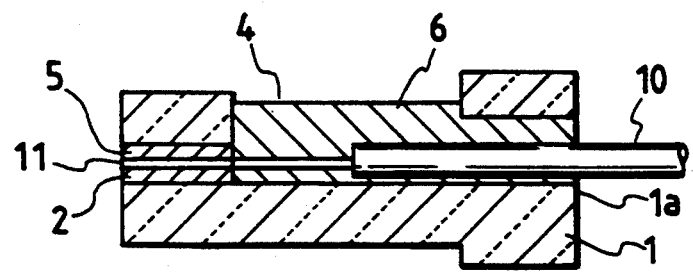
FIG. 1 is a longitudinal sectional view of II—II line of FIG. 3 of an optical connector according to the present invention.
Figure 2:
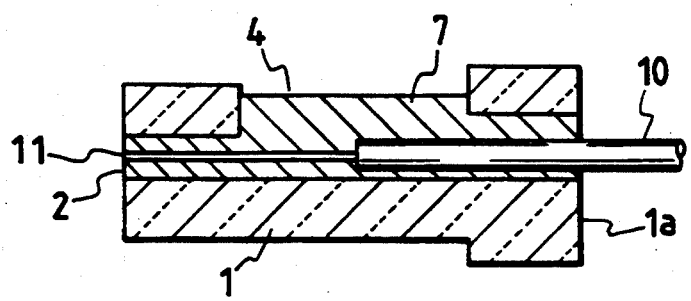
FIG. 2 is a longitudinal sectional view of II—II line of FIG. 3 of a conventional optical connector.
Figure 3:
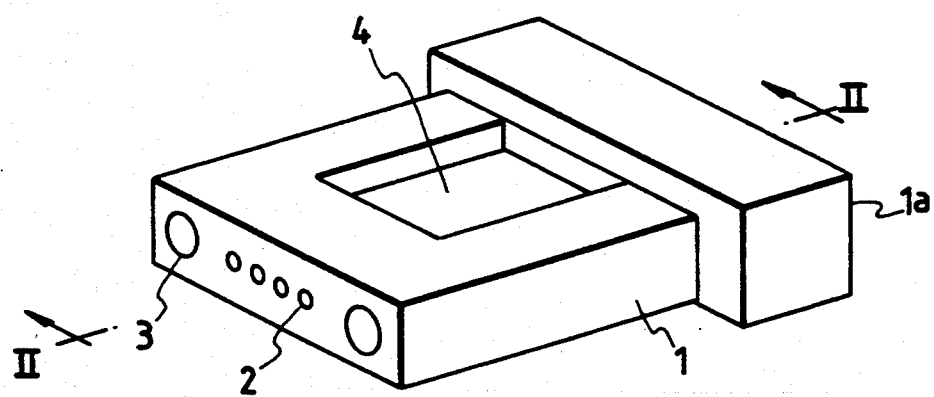
FIG. 3 is a perspective view of an example of an optical connector ferrule.

FIG. 1 is a longitudinal sectional view along line II—II of FIG. 3 of the optical connector according to the present invention. As shown in the drawing, an optical fiber 11 exposed by removal of the coating of the top layer at an end portion of a multi-coated optical fiber 10 is inserted into an optical fiber insertion hole 2 from a rear end portion 1a of a ferrule 1. An adhesive A is charged into the portion of the optical fiber insertion hole 2, and an adhesive B is charged into the portion of an adhesive injection opening 4. By these adhesives, the optical fiber 11 and the multi-coated optical fiber 10 are adhered and fixed to the ferrule 1. The preferable adhesive used in the present invention is epoxy-type adhesive, silicone-type adhesive, acrylic-type adhesive, urethane-type adhesive or the like.

Embodiment 1

An adhesive having a low Young's modulus is used as the adhesive B for the portion of the adhesive injection opening 4 of the ferrule 1 in FIG. 1. Accordingly, the force to attract the ferrule 1 is weak even if the adhesive B shrinks at the time of cooling, so that the deformation of the connector is made small, and the increase of loss in connection is also suppressed. On the other hand, the adhesive A high in Young's modulus is used for the portion of the optical fiber insertion hole 2 in the same manner as in a conventional case. Accordingly, the grinding of the connector end surface can be performed in the same manner as in a conventional case. At this time, since the portion of the optical fiber insertion hole 2 is much smaller in volume than the portion of the adhesive injection opening 4, it is possible to ignore the tensile force caused by the shrinkage of the adhesive.

It is impossible to ignore the deformation of the ferrule 1 when the Young's modulus of the adhesive B for the portion of the adhesive injection opening 4 is not less than 400 kg/mm$^2$. It is therefore preferable that an adhesive not more than 400 kg/mm$^2$ is used. When the Young's modulus of the adhesive A for the portion of the optical fiber insertion hole 2 is less than 500 kg/mm$^2$, the force of holding the optical fiber 11 is so small that the fiber end surface is broken or cracked. It is therefore preferable that the Young's modulus of the adhesive A is not less than 500 kg/mm$^2$.

Embodiment 2

Generally since an adhesive small in linear expansion coefficient has high viscosity or includes a solvent, it is difficult to charge such an adhesive adequately into the portion of the optical fiber insertion hole 2. Therefore, an adhesive B small in linear expansion coefficient is charged into the portion of the adhesive injection opening 4, and an adhesive A slightly high in linear expansion coefficient is used for the portion of the optical fiber insertion hole 2. Preferably the linear expansion coefficient of the adhesive B used for the portion of the adhesive injection opening 4 is from $1.0\times10^{-5}$ (° C.$^{-1}$) to $4.0\times10^{-5}$ (° C.$^{-1}$). Further, preferably, the linear expansion coefficient of the adhesive A used for the portion of the optical fiber insertion hole 2 is from $4.0\times10^{-5}$ (° C.$^{-1}$) to $5.0\times10^{-4}$ (° C.$^{-1}$).

In order to decrease the linear expansion coefficient of an adhesive, it is preferable to make the adhesive contain plenty of inorganic filler. However, the viscosity of the adhesive becomes higher as the content of filler increases, so that it is difficult to charge the adhesive between the optical fiber 11 and the optical fiber insertion hole 2. It is therefore preferable that the content of filler of the adhesive A used for the portion of the optical fiber insertion hole 2 is not more than 30 weight %, and the content of filler of the adhesive B used for the portion of the adhesive injection opening 4 is not less than 40 weight %. The preferable filler used in the present invention is silica, calcium carbonate, alumina, mica or the like. Further, the desirable range of the viscosity of the adhesive is from 50 cps to 2000 cps.

Embodiment 3

In order to prevent shrinkage at the time of cooling, it is also effective to use an ambient-temperature-setting adhesive. However, it is difficult for such an adhesive to flow into the portion of the optical fiber insertion hole 2 at ambient temperature. When an ultraviolet-ray-setting adhesive is used, the inside of the optical fiber insertion hole 2 is not irradiated by ultraviolet rays, so that the adhesive is not adhered completely. Therefore, a thermosetting adhesive is used as the adhesive A for the portion of the optical fiber insertion hole 2, and an ambient-temperature-setting adhesive is used as the adhesive for the portion of the adhesive injection opening 4.

Embodiment 4

As described above, when an adhesive is charged and hardened, a ferrule is deformed by hardening shrinkage so as to give stress to an optical fiber. Although it is preferable to use an adhesive small in coefficient of hardening shrinkage in order to prevent this deformation, such an adhesive small in coefficient of hardening shrinkage generally has so high viscosity that it is difficult to be charged into the optical fiber insertion hole 2. It is therefore effective that an adhesive small in coefficient of hardening shrinkage is used as the adhesive B for the portion of the adhesive injection opening 4 so as to prevent the ferrule 1 from being deformed, while an adhesive slightly high in coefficient of hardening shrinkage is charged as the adhesive A for the portion of the optical fiber insertion hole 2 so as to hold the optical fiber 11. Preferably the coefficient of hardening shrinkage of such an adhesive B used for the portion of the adhesive injection opening 4 is from 0.2 to 1%, and that of such an adhesive A used for the portion of the optical fiber insertion hole is from 1.0 to 10%.

Embodiment 5

The above-described embodiments 1, 2 and 4 can be applied to one adhesive. Namely, it is effective that an adhesive large in Young's modulus, in linear expansion coefficient and in coefficient of hardening shrinkage, the range of which are 500 to 2000 (kg/mm$^2$), $4.0\times10^{-5}$ to $5.0\times10^{-4}$ (° C.$^{-1}$) and 1.0 to 10.0 (%) respectively, is used as the adhesive A for the portion of the optical fiber insertion hole 2. Further, it is effective that an adhesive small in Young's modulus, in linear expansion coefficient and in coefficient of hardening shrinkage, the range of which are 0.01 to 400 (kg/mm$^2$), $1.0\times10^{-5}$ to $4.0\times10^{-5}$ (° C.$^{-1}$) and 0.2 to 1.0 (%) respectively, is used as the adhesive B for the portion of the adhesive injection opening 4.

EXAMPLES

A four-fiber optical connector ferrule illustrated in FIG. 3 was used. An Adhesive A for the optical fiber insertion hole illustrated in FIG. 1 and shown in Tables I to IV was applied to the top end portions of respective optical fibers of four fibers of a four-fiber single-mode coated optical fiber tape. The respective optical fibers were inserted into the optical fiber insertion holes from the rear end portion of the ferrule. After the adhesive had set, an adhesive B for the adhesive injection opening as shown in Tables I to IV was injected to the portion of an adhesive injection opening, so as to make up an optical connector. The quantity of deformation, the loss in connection, and the property of charging the adhesive into the optical fiber insertion holes were evaluated upon such optical connectors. The results are shown in Tables I to IV.

In the results of the above examples as shown in the Tables, the results of the embodiments are better than that of the comparative examples.

Especially, as shown in TABLE IV, the result of the adhesive of the embodiment 5-1 was extremely good. As indicated in the result of the adhesive of the embodiment 5-2, although the extremely small Young's modulus increases the linear expansion coefficient and coefficient of hardening shrinkage, the adhesive deforms itself without generating a force to deform the ferrule so as to obtain a good result.

In addition, as shown in the result of the adhesive of the embodiment 3, the extremely small coefficient of hardening shrinkage makes the linear expansion coefficient small. On the other hand, although it makes the Young's modulus extremely large, the coefficient of hardening shrinkage and the linear expansion are the same as that of the ferrule so as not to generate stress. However, since the adhesive for the adhesive injection opening of the comparative example 5-1 has a large viscosity over 10000 cps, it is difficult to treat such an adhesive. Further, the adhesive of the comparative example 5-2, the deformation of which is small, has a large Young's modulus so as to deform the ferrule and increase the connection loss.

As has been described, according to the optical connector of the present invention, the deformation of a connector ferrule caused by the shrinkage of an adhesive at the time of adhering and fixing an optical fiber and the ferrule is small, and the change of loss in connection is small.

TABLE I

|  | EMBODIMENTS ||| COMPARATIVE EXAMPLES ||||
| --- | --- | --- | --- | --- | --- | --- | --- |
|  | 1-1 | 1-2 | 1-3 | 1-1 | 1-2 | 1-3 | 1-4 |
| YOUNG'S MODULUS (Kg/mm$^2$) ||||||||
| ADHESIVE A | 600 | 600 | 600 | 600 | 600 | 400 | 200 |
| ADHESIVE B | 100 | 200 | 400 | 600 | 800 | 200 | 200 |
| DEFORMATION VOLUME OF CONNECTOR FERRULE ($\mu$m) | <0.1 | <0.1 | <0.1 | 0.2 | 0.2 | <0.1 | <0.1 |
| INCREMENT OF CONNECTION LOSS (dB) | <0.1 | <0.1 | <0.1 | 0.1 | 0.1 | <0.1 | <0.1 |
| FIBER WAS CHIPPED DURING GRINDING CONNECTOR ? | No | No | No | No | No | Yes | Yes |

TABLE II

|  | EMBODIMENT | COMPARATIVE EXAMPLES || EMBODIMENT | COMPARATIVE EXAMPLE |
| --- | --- | --- | --- | --- | --- |
|  | 2-1 | 2-1 | 2-2 | 3-1 | 3-1 |
| ADHESIVE A ||||||
| COEFFICIENT OF LINER EXPANSION | $6.0 \times 10^{-5}$ | $4.0 \times 10^{-5}$ | $6.0 \times 10^{-5}$ | $6.0 \times 10^{-5}$ | $6.0 \times 10^{-5}$ |
| CONDITION OF HARDENING | 80° C. × 1 hr | 80° C. × 1 hr | 80° C. × 1 hr | 80° C. × 1 hr | 23° C. × 24 hr |
| ADHESIVE B ||||||
| COEFFICIENT OF LINER EXPANSION | $4.0 \times 10^{-5}$ | $4.0 \times 10^{-5}$ | $5.0 \times 10^{-5}$ | $6.0 \times 10^{-5}$ | $6.0 \times 10^{-5}$ |
| CONDITION OF HARDENING | 80° C. × 1 hr | 80° C. × 1 hr | 80° C. × 1 hr | 23° C. × 24 hr | 23° C. × 24 hr |
| DEFORMATION VOLUME OF CONNECTOR FERRULE ($\mu$m) | <0.1 | <0.1 | 0.2 | <0.1 | <0.1 |
| INCREMENT OF CONNECTION LOSS (dB) | <0.1 | <0.1 | 0.1 | <0.1 | <0.1 |
| ADHESIVE WAS CHARGED QUITE INTO OPTICAL FIBER INSERTION HOLE ? | Yes | No | Yes | Yes | No |

TABLE III

|  | EMBODIMENT | COMPARATIVE EXAMPLES ||
| --- | --- | --- | --- |
|  | 4-1 | 4-1 | 4-2 |
| ADHESIVE A ||||
| COEFFICIENT OF HARDENING SHRINKAGE % | 3.0 | 1.0 | 3.0 |
| CONDITION OF HARDENING | 80° C. × 1 hr | 80° C. × 1 hr | 80° C. × 1 hr |
| ADHESIVE B ||||
| COEFFICIENT OF HARDENING SHRINKAGE % | 1.0 | 1.0 | 1.5 |
| CONDITION OF HARDENING | 80° C. × 1 hr | 80° C. × 1 hr | 80° C. × 1 hr |
| DEFORMATION OF CONNECTOR FERRULE ($\mu$m) | <0.1 | <0.1 | 0.2 |
| INCREMENT OF CONNECTION LOSS (dB) | <0.1 | <0.1 | 0.1 |
| ADHESIVE WAS CHARGED QUITE INTO OPTICAL FIBER INSERTION HOLE ? | Yes | No | Yes |

TABLE IV

|  | EMBODIMENTS || COMPARATIVE EXAMPLES ||
| --- | --- | --- | --- | --- |
|  | 5-1 | 5-2 | 5-1 | 5-2 |
| ADHESIVE A |||||
| YOUNG'S MODULUS (kg/mm$^2$) | 600 | 600 | 600 | 600 |
| LINEAR EXPANSION COEFFICIENT (°C.$^{-1}$) | $6.0 \times 10^{-5}$ | $6.0 \times 10^{-5}$ | $6.0 \times 10^{-5}$ | $6.0 \times 10^{-5}$ |
| COEFFICIENT OF HARDENING SHRINKAGE (%) | 1.5 | 1.5 | 1.5 | 1.5 |
| ADHESIVE B |||||
| YOUNG'S MODULUS (kg/mm$^2$) | 400 | 0.1 | 2000 | 1500 |
| LINEAR EXPANSION COEFFICIENT (°C.$^{-1}$) | $4.0 \times 10^{-5}$ | $2.0 \times 10^{-4}$ | $1.5 \times 10^{-5}$ | $2.0 \times 10^{-5}$ |
| COEFFICIENT OF HARDENING SHRINKAGE (%) | 1.0 | 3.0 | 0.3 | 0.5 |
| DEFORMATION OF CONNECTOR FERRULE ($\mu$m) | <0.1 | <0.1 | <0.1 | 0.2 |
| INCREMENT OF CONNECTION LOSS (dB) | <0.1 | <0.1 | <0.1 | 0.1 |
| FIBER WAS CHIPPED DURING GRINDING CONNECTOR ? | No | No | No | No |
| ADHESIVE WAS CHARGED QUITE INTO | Yes | Yes | Yes | Yes |

TABLE IV-continued

| | EMBODIMENTS | | COMPARATIVE EXAMPLES | |
| --- | --- | --- | --- | --- |
| | 5-1 | 5-2 | 5-1 | 5-2 |
| OPTICAL FIBER INSERTION HOLE ? | | | | |

What is claimed is:

1. An optical connector for housing end portions of a plurality of multi-coated optical fibers, the optical connector comprising:
   a ferrule having a plurality of optical fiber insertion holes constructed and arranged to receive exposed end portions of individual optical fibers therein said ferrule including an adhesive injection opening;
   a first adhesive for use in said optical fiber insertion hole and constructed and arranged to adhere the exposed end portions of the optical fibers to the ferrule; and
   a second adhesive for use in said adhesive injection opening and constructed and arranged to adhere and fix the plurality of optical fibers to the ferrule, said first adhesive having a Young's modulus different from a Young's modulus of said second adhesive.

2. An optical connector according to claim 1, wherein the Young's modulus of the adhesive used for the portion of the optical fiber insertion hole is from 500 to 2000 kg/mm$^2$.

3. An optical connector according to claim 1, wherein the Young's modulus of the adhesive used for the portion of the adhesive injection opening is from 0.01 to 400 kg/mm$^2$.

4. An optical connector for housing end portions of a plurality of multi-coated optical fibers, the optical connector comprising:
   a ferrule having a plurality of optical fiber insertion holes constructed and arranged to receive exposed end portions of individual optical fibers therein, said ferrule including an adhesive injection opening;
   a first adhesive for use in said optical fiber insertion hole and constructed and arranged to adhere the exposed end portions of the optical fibers to the ferrule; and
   a second adhesive for use in said adhesive injection opening and constructed and arranged to adhere and fix the plurality of optical fibers to the ferrule, said first adhesive having a linear expansion coefficient different from a linear expansion coefficient of said second adhesive.

5. An optical connector according to claim 4, wherein the linear expansion coefficient of the adhesive used for the portion of the adhesive injection opening is from $1.0 \times 10^{-5}$ to $4.0 \times 10^{-5}$ (° C.$^{-1}$).

6. An optical connector according to claim 4, wherein the content of filler included in the adhesive used for the portion of the optical fiber insertion hole equal to or less than 30 weight %.

7. An optical connector according to claim 4, wherein the content of filler included in the adhesive used for the portion of the adhesive injection opening is equal to or more than 40 weight %.

8. An optical connector according to claim 4, wherein the viscosity of the adhesives are from 50 cps to 2000 cps.

9. An optical connector for housing end portions of a plurality of multi-coated optical fibers, the optical connector comprising:
   a ferrule having a plurality of optical fiber insertion holes constructed and arranged to receive exposed end portions of individual optical fibers therein, said ferrule including an adhesive injection opening;
   a first high temperature curing adhesive for use in said optical fiber insertion hole and constructed and arranged to adhere the exposed end portions of the optical fibers to the ferrule; and
   a second ambient temperature curing adhesive for use in said adhesive injection opening and constructed and arranged to adhere and fix the plurality of optical fibers to the ferrule.

10. An optical connector for housing end portions of a plurality of multi-coated optical fibers, the optical connector comprising:
    a ferrule having a plurality of optical fiber insertion holes constructed and arranged to receive exposed end portions of individual optical fibers therein, said ferrule including an adhesive injection opening;
    a first adhesive for use in said optical fiber insertion hole and constructed and arranged to adhere the exposed end portions of the optical fibers to the ferrule; and
    a second adhesive for use in said adhesive injection opening and constructed and arranged to adhere and fix the plurality of optical fibers to the ferrule, said first adhesive having a coefficient of hardening shrinkage different from a coefficient of hardening shrinkage of said second adhesive.

11. An optical connector according to claim 10, wherein the coefficient of hardening shrinkage of the adhesive used for the portion of the adhesive injection opening is from 0.2 to 1.0%.

12. An optical connector according to claim 10, wherein the coefficient of hardening shrinkage of the adhesive used for the portion of the optical fiber injection hole is from 1.0 to 10.0%.

13. An optical connector for housing end portions of a plurality of multi-coated optical fibers, the optical connector comprising:
    a ferrule having a plurality of optical fiber insertion holes constructed and arranged to receive exposed end portions of individual optical fibers therein, said ferrule including an adhesive injection opening;
    a first adhesive for use in said optical fiber insertion hole and constructed and arranged to adhere the exposed end portions of the optical fibers to the ferrule; and
    a second adhesive for use in said adhesive injection opening and constructed and arranged to adhere and fix the plurality of optical fibers to the ferrule, said first and second adhesives having different properties such that upon curing the adhesives, the first adhesive does not significantly stress the exposed portions of the optical fibers.

14. An optical fiber according to claim 13, wherein the adhesives different in Young's modulus, linear expansion coefficient and coefficient of hardening shrinkage, are used for the portion of the optical fiber insertion hole and the portion of the adhesive injection opening, respectively.

15. An optical connector according to claim 14, wherein the adhesive used for an optical fiber insertion hole has Young's modulus from 500 to 2000 kg/mm$^2$, linear expansion coefficient from $4.0 \times 10^{-5}$ to $5.0 \times 10^{-4}$ (°C.$^{-1}$), and coefficient of hardening shrinkage from 1.0 to 10.0%; and the adhesive used for an adhesive injection opening has Young's modulus from 0.01 to 400 kg/mm$^2$, linear expansion coefficient from $1.0 \times 10^{-5}$ to $4.0 \times 10^{-5}$ (°C.$^{-1}$), and coefficient of hardening shrinkage from 0.2 to 1.0%.

* * * * *